Patented Feb. 27, 1923.

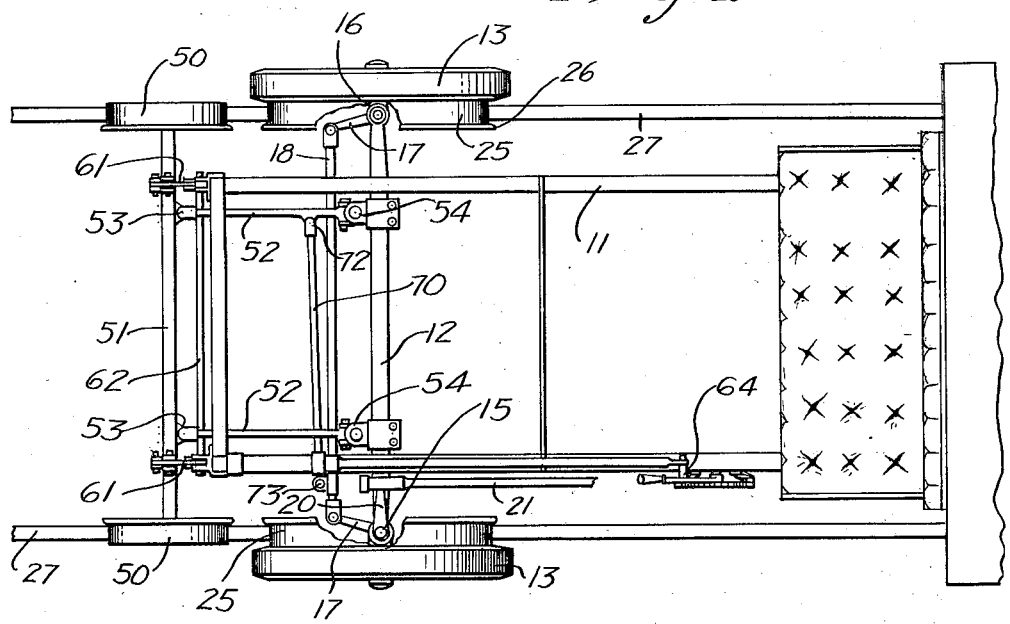
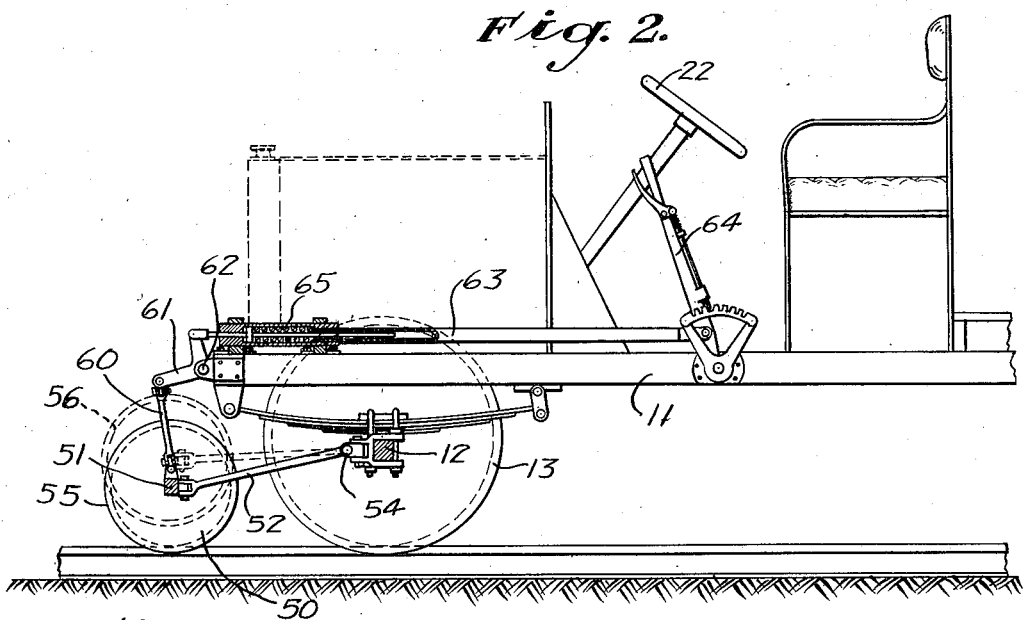
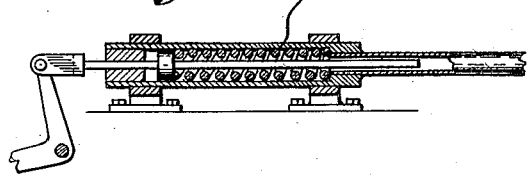

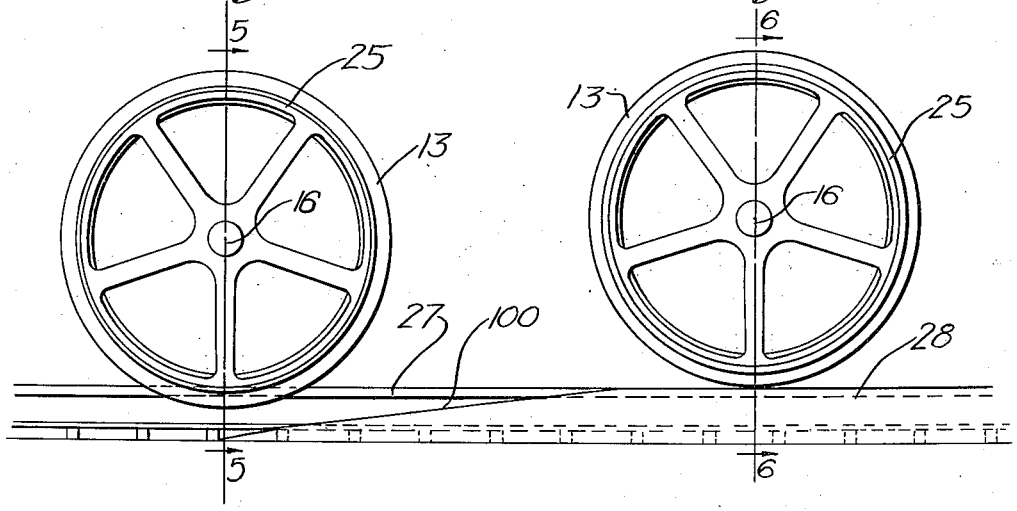
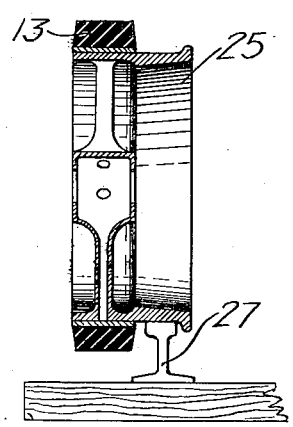
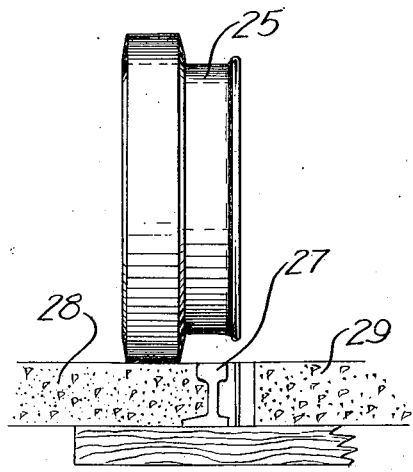

1,446,784

UNITED STATES PATENT OFFICE.

SAMUEL C. CARTER, OF GLENDALE, CALIFORNIA, ASSIGNOR, BY MESNE ASSIGNMENTS, OF ONE-HALF TO INTERNATIONAL MOTOR COMPANY, A CORPORATION OF DELAWARE.

MOTOR TRUCK AND TRACK STRUCTURE FOR MOTOR TRUCKS.

Application filed May 24, 1922. Serial No. 563,324.

*To all whom it may concern:*

Be it known that I, SAMUEL C. CARTER, a citizen of the United States, residing at Glendale, in the county of Los Angeles, State of California, have invented a new and useful Improvement in Motor Trucks and Track Structures for Motor Trucks, of which the following is a specification.

My invention relates to motor trucks and an object of the invention is to provide a motor truck which can be used to run either on railway tracks or on ordinary pavement. This is accomplished by the provision of a flanged metal wheel attached to the inner side of the wheel carrying the rubber tire of the ordinary motor truck. The flanged metal wheel is made slightly smaller in diameter than the rubber tire so that it clears the roadway when the rubber tire is resting on a flat surface. Trucks of this character may be used in connection with railway tracks, the truck running on the pavement in the city streets and being adapted to pass readily onto railway tracks either in these streets in which the space between and along side the rails is paved, or onto the standard type of railway track in which the rails project above the road bed.

A further object of my invention is to provide a truck which may be run on railway tracks and which will not be derailed at street crossings or at points where pavement is inserted between the rails.

A further object of this invention is to provide a guiding means by which the truck will follow a railway track even where the spaces between and outside the rails of this track are fully paved.

A still further object of my invention is to provide a special form of track construction at street intersections.

Further objects and advantages will be made evident hereinafter.

Referring to the drawing, which is for illustrative purposes only,

Fig. 1 is a plan view of a track equipped with my invention.

Fig. 2 is a side elevation of same.

Fig. 3 is a view of a truck wheel resting on a rail.

Fig. 4 is a view of the same wheel resting on the pavement outside the rail.

Fig. 5 is a section on a plane represented by the line 5—5 of Fig. 3.

Fig. 6 is an elevation on a plane represented by the line 6—6 of Fig. 4.

Fig. 7 is a detail section of a spring.

In the form of the invention shown, 11 is a truck frame having a front axle 12 to which front wheels 13 are secured about a vertical pivot 15 in the usual manner, these wheels 13 each being mounted on a spindle 16, which is secured to the pivot 15 at right angles thereto. Extending from each of the front wheel spindles 16 is a lever arm 17, these arms being connected by a tie bar 18. Also secured to one of the pivots 15 is a short arm 20 which is connected through a drag member 21 and other standard mechanism to a steering wheel 22. All of the parts so far described are standard in truck construction, the steering wheel 22 being used to turn the front wheels 13 about the pivots 15 and thus direct the movement of the truck.

Formed on the inside of the wheels 13 which carry the ordinary rubber tires are metal wheels 25 having flanges 26 which hold these wheels on rails 27, the wheels 25 being of standard railway gauge. It is obvious that by providing all four wheels of the truck with metal wheels 25 that this truck can be run upon a railway track as well as upon the street and that it can be loaded at a warehouse remote from the railway tracks, run to the railway tracks, and can then travel on the tracks to its place of destination at which point it can leave the railway tracks for purposes of distribution.

If the flanged metal wheels 25 are placed inside the rubber wheels 13 so that relationship of these wheels when resting on a rail is as shown in Fig. 5, certain difficulties will be experienced whenever the truck is operated on railway tracks situated on paved streets due to the fact that the space outside the rails 27 is paved, as shown at 28 in Fig. 6, and that the space inside the tracks is paved, as shown at 29 in that figure. This pavement may not be continuous and, in some cases, may only exist at points where paved highways cross the railroad tracks. It is obvious that if the truck is approaching such a highway crossing with the wheel in the position shown in Figs. 3 and 5, during the time of crossing the highway, the wheel will pass into the position shown in Figs. 4 and 6, the rubber tire resting on the paving 28 and the metal wheel 25 being entirely raised from the track.

It is further evident that unless the driver of the truck is extremely expert that upon leaving the pavement 28 there is a great possibility that the metal wheel 25 will fail to land squarely on the track 27 and accidents will happen. It is for the purpose of holding the wheels in such a position, during this transition from the rail to the highway and from the highway to the rail, that the flanged wheels 25 will strike squarely upon the track upon going back upon the rail that my invention is designed.

It comprises a pair of guide wheels 50 carried on an axle 51 which is attached to the front axle 12 by means of two connecting rods 52 which are vertically pivoted at 53 and universally pivoted at 54. The axle 51 may be raised from the position shown in 55 to the position shown in 56, that is, from a position resting upon the track 27 into a position entirely free from this track, by means of links 60 carried on bell cranks 61 which are rigidly connected to a shaft 62 which may be turned by means of a rod 63 and an operating lever 64. A spring 65 tends to resiliently hold the wheels 50 in contact with the track 27. The wheels 50 carry no load and are free to follow the track, being guided thereby due to the universal connection 54 and the vertical connection 53. These wheels are utilized to guide the front wheels of the truck when the wheels 25 are out of contact with the track 27, this being accomplished by means of a connecting rod 70 attached to one of the members 52 by a suitable pivot joint 72 and attached to the member 18 by a pivot joint 73, as shown in Fig. 1.

The method of operation is as follows:

The wheels 50 are raised by means of the handle 64 whenever the truck is operated on an ordinary pavement, these wheels being lowered whenever the truck is run upon a railway track, the wheels 50 resting upon the rail 27. These wheels 50 being flanged on the inner side, will follow any railway track which is so constructed as to retain the ordinary railway car, since in paving streets about railway tracks a space is left inside the rail for the flange of the wheels. The wheels 50, following the track 27, turn the front wheels of the truck through the member 70 so that these front wheels will remain in proper alignment with relation to the track even when the metal wheels 25 are raised from the track 27 and the truck is running on the pavement as shown in Figs. 4 and 6. It is, therefore, unnecessary for the truck driver to exercise any caution in crossing highways, the guide wheels 50 holding the truck in the proper position so that it automatically takes to the track again upon leaving the pavement.

A valuable feature of my invention is the provision of an inclined plane 100 outside each of the rails 27 at points where it is desired to pass from the pavement to the rail or vice versa and at either side of highway crossing.

I claim as my invention:

1. In a vehicle, the combination of: wheels having tread portions adapted to engage a road surface and flanges of smaller diameter than said tread portions, said flanges being adapted to engage a rail; and means for holding said rail engaging flanges over said rail while said road engaging treads are passing over a crossing.

2. In a vehicle, the combination of: wheels having road engaging tread portions and rail engaging flange portions; a guide wheel having a flange adapted to cause said guide wheel to follow a rail; and means by which said guide wheel directs and guides said wheels when said rail engaging flange portions are raised from said rail by said road engaging tread portions making contact with a pavement adjacent to said rail.

In testimony whereof, I have hereunto set my hand at Los Angeles, California, this 18th day of May, 1922.

SAMUEL C. CARTER.